J. M. WORTH.
TRACTION MECHANISM.
APPLICATION FILED JUNE 2, 1917. RENEWED JAN. 17, 1921.
1,376,851.
Patented May 3, 1921.
2 SHEETS—SHEET 1.
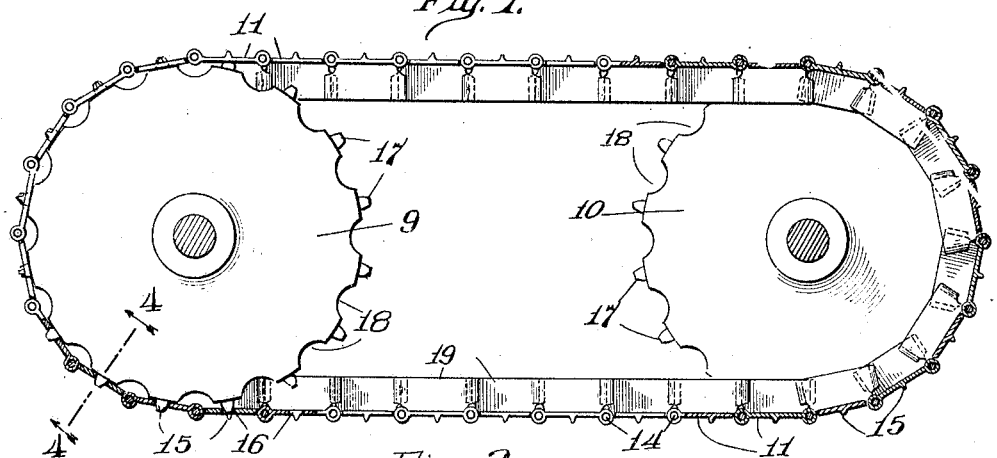
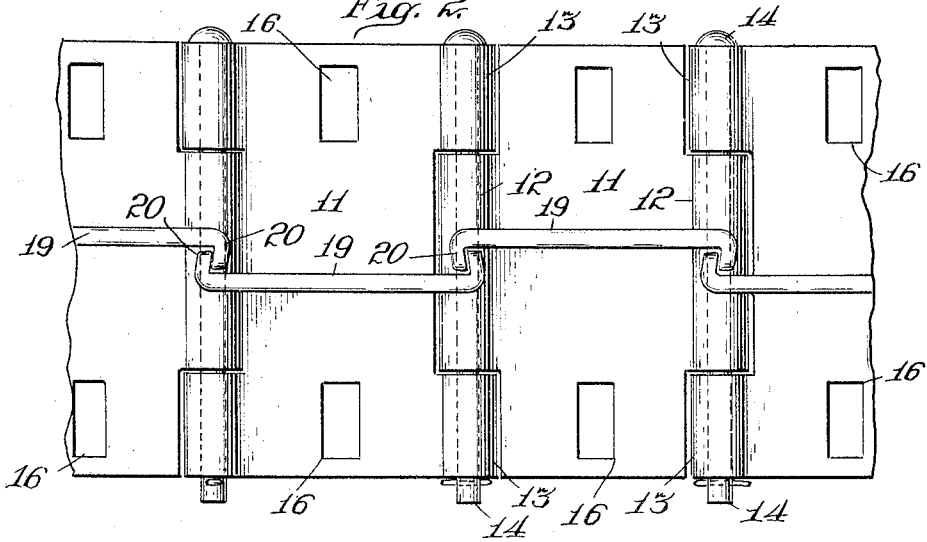
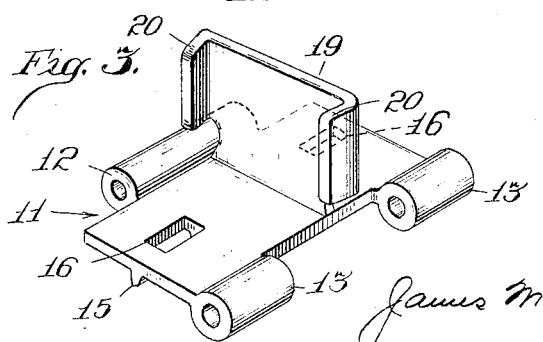

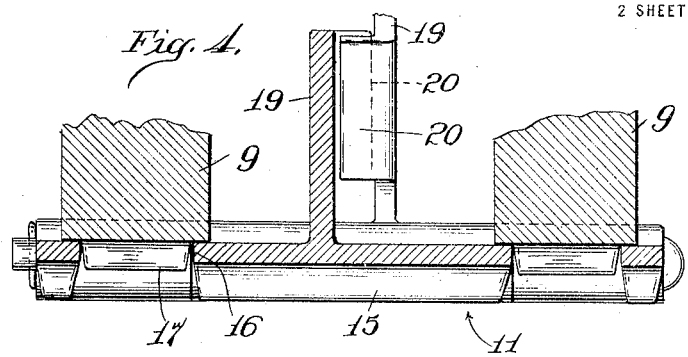
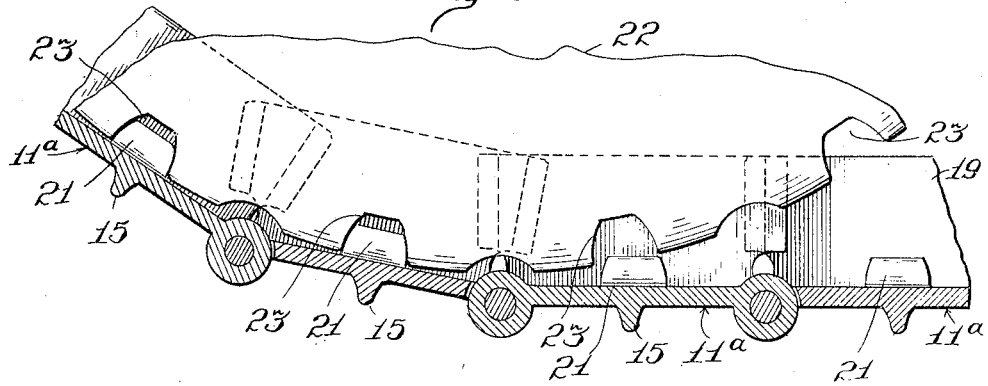
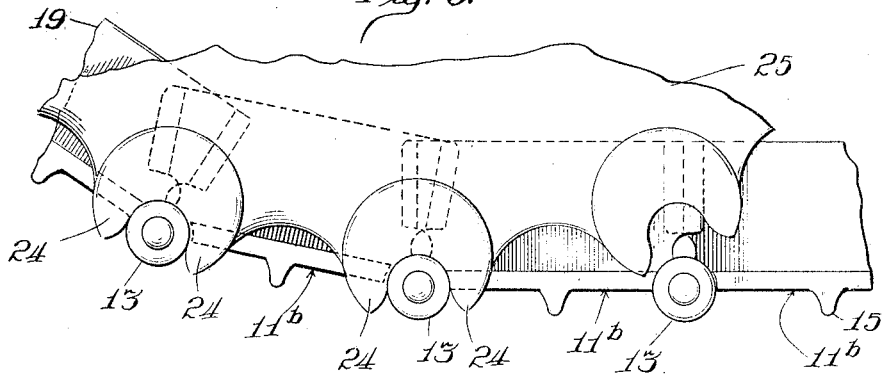

UNITED STATES PATENT OFFICE.

JAMES M. WORTH, OF CHICAGO, ILLINOIS.

TRACTION MECHANISM.

1,376,851.  Specification of Letters Patent.  Patented May 3, 1921.

Application filed June 2, 1917, Serial No. 172,372. Renewed January 17, 1921. Serial No. 437,962.

*To all whom it may concern:*

Be it known that I, JAMES M. WORTH, a citizen of the United States, and a resident of Chicago, in the county of Cook and State of Illinois, have invented certain new and useful Improvements in Traction Mechanism, of which the following is a description, reference being had to the accompanying drawings, which form a part of my specification.

My invention relates to traction mechanism especially intended for use in connection with traction engines and the like, having for its object the provision of an endless tractor element or belt provided on its inner side with interlocking surfaces constructed so as to practically act as a rigid truss between the centers of the axles of the wheels about which said traction element passes.

Another object of my invention is to provide mechanism of the class specified which will be absolutely rigid intermediate of the driver and the driven wheels without the use of any intermediate supports, and therefore without friction-producing means; the tractor-element being provided with interlocking truss-forming portions which will maintain the tractor-element absolutely rigid against any upward pressure or flexing so that a large traction area or bearing surface is provided.

The object of my invention is to also provide a simple, strong and economical construction, that may readily flex as it passes about the wheels beyond the centers of the axles; said invention being set forth in modified forms which are believed to be the best embodiments of the invention; it will be understood, however, that the invention may be expressed in somewhat different mechanical form without, however, departing from the spirit of the invention.

The above enumerated purposes and advantages, as well as others inherent in the invention, will be more fully comprehended from the following detailed description of the accompanying drawings, wherein:—

Figure 1 is a partial elevation and partial sectional view of my improved traction mechanism, a portion of one of the wheels being removed to more clearly illustrate the relation between the endless element and the wheels.

Fig. 2 is an enlarged top plan view of a portion of the tractor-element.

Fig. 3 is a perspective view of one of the links or members of the tractor-element.

Fig. 4 is a cross-section taken on the line 4—4 of Fig. 1 looking in the direction of the arrows.

Fig. 5 is a side elevation of a portion of a wheel and tractor-element showing a modified form.

Fig. 6 is a similar view of another modification.

In the particular exemplification of the invention, as illustrated in the first four figures of the drawings, I show a pair of wheels 9 and 10, made similar in construction and preferably consisting of two disk-portions arranged parallel and in spaced relation so as to provide an intervening space or clearance for the inwardly presented truss-forming portions of the tractor-element; it being understood, of course, that one of the wheels constitutes the power or driving wheel.

The tractor-element comprises a series of shoes or cleats 11, preferably of cast steel, terminating at opposite ends in the pintle or pin-receiving socket portions 12 and 13, 13; the pin-receiving portion 12 being formed at a point intermediate of the sides of the cleat or shoe while the pin-receiving members 13, 13 on the opposite end of the cleat or shoe are arranged adjacent the opposite sides of the cleat so as to provide an intervening space corresponding in length with that of the pin-receiving socket 12 of the adjacent cleat or shoe.

As is apparent from the construction, the socket-portion 12 of one cleat or shoe, with the socket portions 13, 13 of the adjacent shoe, enables the formation of the hinged joint, because the openings of the respective sockets will be in register to receive the connecting pin 14, when the portion 12 of one cleat is placed intermediate of the two portions 13 of the adjacent cleat, as shown in Fig. 2.

The pin 14 may be of any suitable construction, and be held in place in any suitable manner; I having illustrated the pins with a head at one end, while the other is adapted to receive a suitable cotter pin whereby accidental withdrawal of the pin is prevented.

The bottom surface of each cleat or shoe may be provided with the tooth or surface-engaging lug 15, extending either throughout the entire length of the shoe from side to side or merely at points adjacent opposite sides. The cleats or shoes are also preferably provided with openings 16, 16 adjacent opposite sides of the cleat, adapted to receive the projections or lugs 17 formed on the peripheries of both disks or felly-portions of the wheel, at predetermined distances apart; it being understood, of course, that the distances between the projections 17 on the felly-portions of the wheel correspond with the distance between the openings 16 of one cleat or shoe and the opening of the adjacent cleat or shoe.

This construction affords a positive relation between the wheels and the tractor-element and will prevent the possibility of any slippage between wheel and element; and the projections 17 also provide ground-gripping portions. The peripheries of the wheels are also preferably shown provided with the depressions or sockets 18 adapted to receive the hinged joints between the respective shoes or cleats formed by the pin-receiving alined socket-portions 12 and 13, as clearly shown in Fig. 1.

Preferably at a point intermediate of the sides, the upper surface of each cleat is provided with an upwardly presented truss-forming rib 19, preferably formed integral with the main portion of the cleat, as shown in Fig. 3, where the lower part of the rib 19 is shown of the same width as the cleat, while the upper part is of greater width so as to provide the bent ends or hooks 20, 20, both of which are preferably bent toward the same side of the rib. As more clearly shown in Fig. 2, the truss-forming ribs 19 are arranged slightly toward one side of the cleat, that is, on one side of the longitudinal center line of the tractor-element; with the truss-forming rib of each alternate cleat being arranged on the opposite side of the longitudinal center line of the element; the ends of the ribs of successive cleats being bent or disposed in the opposite direction, so that the bent ends of the truss-forming rib of one cleat may have interlocking relation with the truss-forming rib of the next adjacent cleat, as clearly shown in Fig. 2.

As is evident from the construction shown and described, the interlocking relation provided by the truss-forming ribs 19, is such, however, as will enable the tractor-element to pass about the fellies of the wheels; the positioning of the interlocked ribs while the cleats are passing about the wheels, being shown in dotted lines in Fig. 1. On the other hand, broad interlocking surface 20, provided by the truss-forming ribs 19, will prevent any flexing of the tractor-element, when the same is held under proper tension, at a point intermediate of the vertical planes of the axles of the two wheels.

In Fig. 5 I show a modification of my invention, wherein the cleats 11ª, so far as the truss-forming ribs 19 and the hinged forming-sockets 12 and 13 are concerned, are identical with the cleats or shoes shown in the first four figures of the drawings. In this construction, however, each cleat or shoe is provided on its inner or wheel-engaging surface with lugs 21, preferably adjacent the sides of the cleat or shoe and at points intermediate of the ends where the cleats or shoes come into contact with the fellies of the wheels. With this construction, the wheels 22 have their fellies provided with sockets 23 adapted to receive the lugs 21, as very clearly shown to the left in Fig. 5, thereby providing a non-slipping firm relation between the tractor-element and the wheels.

It is evident from the construction shown and described, that with the tractor-element of a length just sufficient to extend about the peripheries of the two wheels, the interlocking ribs 19 will prevent any flexing of the tractor-element and at the same time provide proper flexibility at the points where the elements move about the wheels.

In Fig. 6 I show another modified form of my invention, wherein the cleats or shoes 11ᵇ are made substantially similar to the cleats or shoes 11 and provided with the truss-forming ribs 19 of similar construction; the cleats or shoes being also provided with the ground-gripping protrusions or lugs 15. In this construction, however, the hinge-forming socket-portions 13 at one end of each cleat or shoe and at opposite sides are preferably made to extend slightly beyond the sides of the cleat or shoe so as to be engaged by the claws 24, arranged in pairs on the peripheries of the wheel 25.

In addition to providing a firm or positive and non-slipping relation between the tractor-element and the wheel, the claws 24 will also provide a gripping relation with the ground and therefore also assist in the traction; it being understood, of course, that the claws 24 of adjacent sets or pairs are arranged at a distance apart corresponding with the length of each cleat or shoe.

I have shown and described what I believe to be the simplest and best embodiment of my invention, but it is evident that it may have different mechanical form in certain respects without, however, departing from the spirit of my invention.

What I claim is:—

1. Traction mechanism, comprising an endless tractor-element composed of a plurality of cleats having ground-engaging surfaces, while the opposite or upper side is provided with vertically disposed portions of comparative height, the ends of said vertically disposed portions being bent into hook-form, the vertically disposed portions of successive cleats being disposed on opposite sides of the longitudinal center line of the endless element, with the bent ends disposed in opposite directions so as to provide interlocking engagement between the vertically disposed portions of adjacent cleats, the ends of the cleats being provided with alternating extended portions and a recess, with the extended portion of one cleat adapted to enter the recess of the adjacent cleat, said extended portions being provided with registering holes to receive connecting pins.

2. Traction mechanism, comprising a tractor-element composed of a series of cleats or shoes, one end of each shoe being provided with extensions and an intervening recess while the other end of each shoe is provided with an extension adapted to enter the recess of an adjacent shoe, all of said extensions being provided with registering holes adapted to receive a connecting pin, each shoe being provided with a vertically disposed rib of comparative height at a point intermediate of the sides of the shoe, the ends of the rib being disposed over the pivotal points of the shoe and bent into hook-form, with the bent ends of the rib of each alternating shoe disposed in the opposite direction so as to provide interlocking relation between the ribs of adjacent shoes.

3. Traction mechanism, comprising an endless tractor-element composed of a plurality of cleats or shoes having ground-engaging lugs while the opposite or inner surface of each cleat is provided with a vertically disposed rib of comparative height at a point intermediate of the sides of the shoe and in proximity to the center line of said endless element, the ends of said vertically disposed rib being disposed beyond the normal sides of the cleat and bent into hook-form, the hook ends of adjacent members being arranged on opposite sides of the longitudinal center line of the element with the hook ends of each alternating cleat disposed in the opposite direction so as to permit interlocking relation between the vertically disposed ribs of adjacent cleats, one end of each cleat being provided with extensions and an intervening recess while the other end of each cleat is provided with an extension adapted to enter the recess of an adjacent shoe, with all of said extensions provided with registering holes adapted to receive a connected pin whereby the cleats are hingedly connected together into an endless element.

JAMES M. WORTH.

Witnesses:
 GEORGE HEIDMAN,
 F. A. FLORELL.